United States Patent
Hunter

[11] 3,854,346
[45] Dec. 17, 1974

[54] AUTOMATIC CONTROLLER DRIVE MECHANISM

[75] Inventor: Edwin J. Hunter, Riverside, Calif.

[73] Assignee: The Toro Company, San Marcos, Calif.

[22] Filed: Nov. 22, 1972

[21] Appl. No.: 308,649

Related U.S. Application Data

[62] Division of Ser. No. 190,530, Oct. 19, 1971, Pat. No. 3,735,779.

[52] U.S. Cl. ............................ 74/568 T, 192/41 S
[51] Int. Cl. ........................................... F16h 53/00
[58] Field of Search............ 192/41 S; 74/568 T, 55

[56] References Cited
UNITED STATES PATENTS

| | | | |
|---|---|---|---|
| 2,548,747 | 4/1951 | Starkey | 192/41 S |
| 2,821,434 | 1/1958 | Hunter et al. | 239/64 |
| 2,833,383 | 5/1958 | Christensen | 192/41 S |
| 3,033,949 | 5/1962 | Hehl | 74/568 T |
| 3,090,249 | 5/1963 | Martin | 74/568 T |
| 3,588,391 | 6/1971 | Banathy | 74/568 T |

Primary Examiner—Benjamin W. Wyche
Assistant Examiner—Wesley S. Ratliff, Jr.

[57] ABSTRACT

An automatic control apparatus having a camming means for operating a series of cam followers, a constant speed electric motor, and clutch and transmission means for selectively connecting the camming means to the constant speed motor to be driven thereby past the cam followers, such followers offering resistance to the movement of the camming means thereby when engaged by the camming means, is provided with rapid advance means associated between the clutch-transmission means and the camming means for storing energy received from the motor during operation thereof and for releasing the same to advance the camming means between engagements with the cam followers more rapidly than the advancement normally caused thereby by the motor. The transmission means has a drive shaft connected to the motor and the rapid advance means has a tubular member connected to the camming means and having an inside bore portion with a predetermined internal diameter, a wound wire spring secured at one end to the transmission means drive shaft and having an enlarged diameter portion adjacent the other end in a press fit in the tubular member to store energy during relative rotation between the drive shaft and tubular member prior to an operating cycle and for releasing such energy to rapidly advance the tubular member and associated camming means relative to the transmission means drive shaft during an operating cycle. The spring means is mounted in coaxial bores in a drive shaft and cam shaft, the latter having mating convex and concave bearing surfaces facilitating relative rotation therebetween during twisting and untwisting of the associated spring means.

4 Claims, 12 Drawing Figures

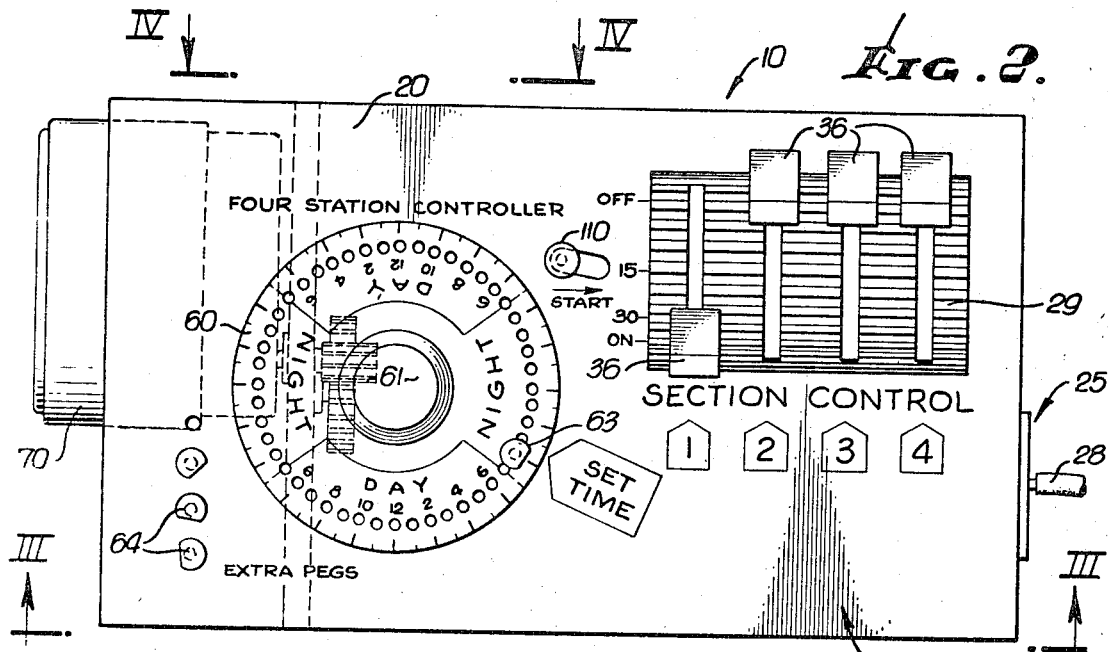
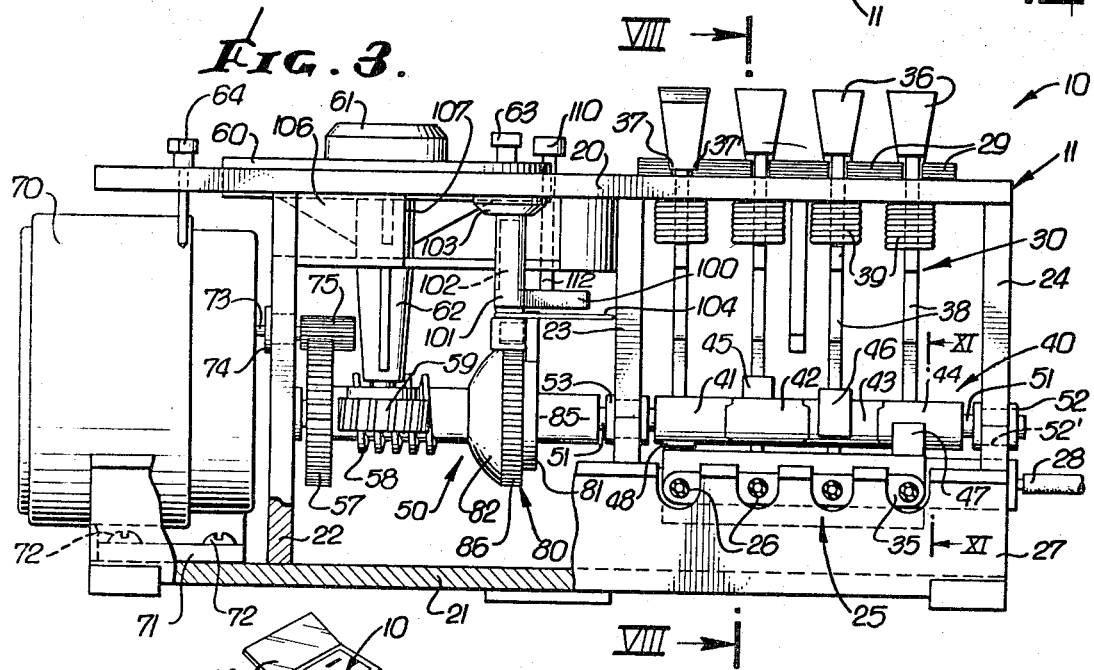
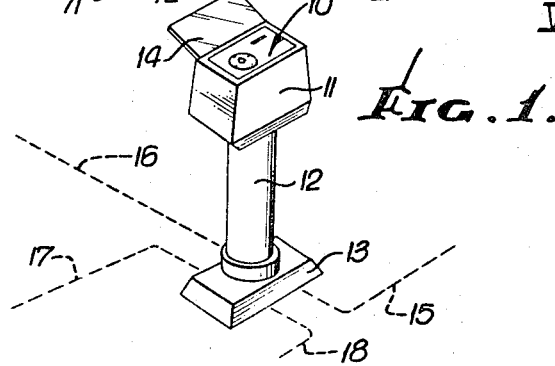

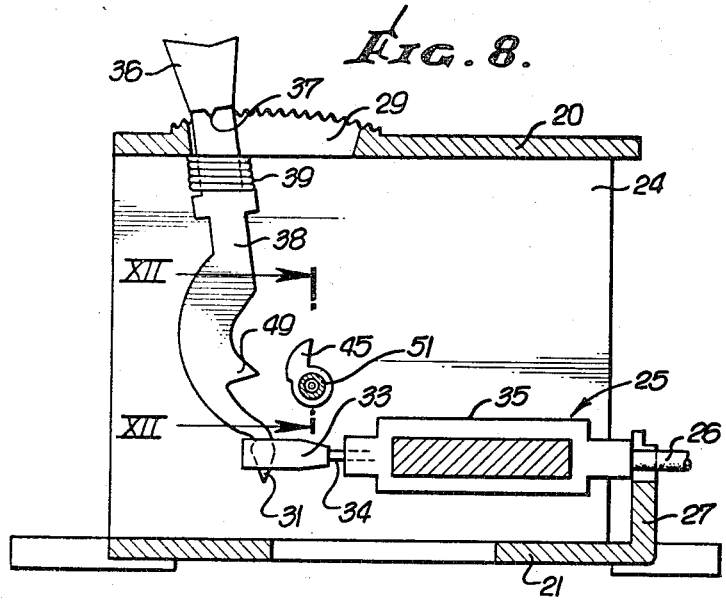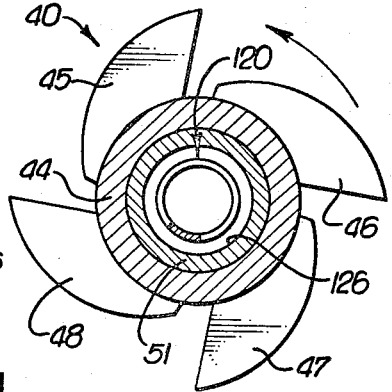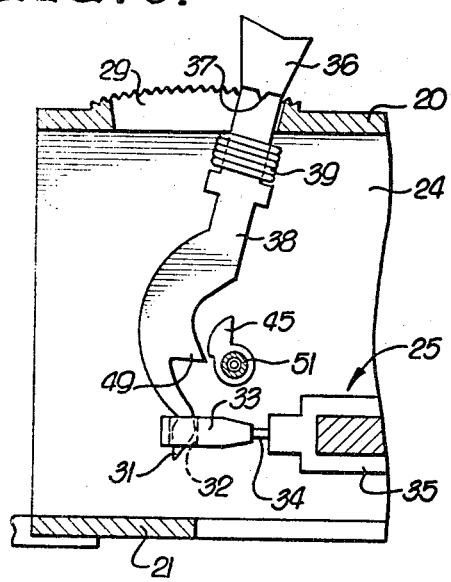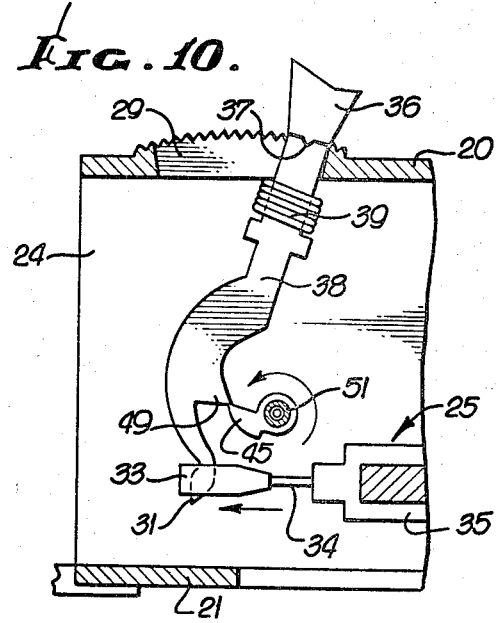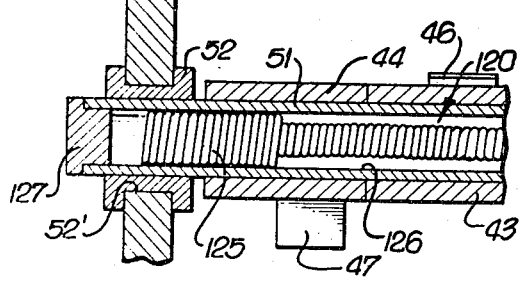

AUTOMATIC CONTROLLER DRIVE MECHANISM

This is a division, of application Ser. No. 190,530, filed 10/19/71, now U.S. Pat. No. 3,735,779.

BACKGROUND OF THE INVENTION

The present invention relates to automatic irrigation control apparatus and particularly to an improvement in drive mechanism for such control apparatus or devices. The exemplary embodiment of control apparatus disclosed and described herein is an improvement in the automatic irrigation control apparatus, and particularly the drive mechanism therefor, of the control apparatus of U.S. Pat. No. 2,821,434 of which I am a co-inventor, the disclosure of said U.S. Pat. No. 2,821,434 being incorporated herein by this reference.

Generally stated, the automatic irrigation control apparatus of the aforesaid patent includes a bank of pilot water valves operated by a series of control levers, camming means for operating the levers, an electric motor drive means, generally a constant speed clock-type motor, and transmission and clutch means for selectively connecting the camming means to the constantly running motor drive means. As a cam on the camming means interferes with an associated control lever of this prior control apparatus, the control apparatus opened an associated pilot valve to allow water flow to a pilot operated water valve in a selected area of an irrigation system to initiate a watering or sprinkling operation therein. A timing or watering cycle therefor continued during the constant speed driving of the cam past a cam follower portion provided in the control lever, the length of the watering or sprinkling operation being adjustable through movement of the control lever. However, in this prior controller, the camming means was driven at the same constant speed between engagements with the various control levers as when being driven through an engagement with a control lever. Therefore, the overall time required for completion of the irrigation cycle for the six sections corresponding to the six control levers illustrated in the aforesaid U.S. Pat. No. 2,821,434 required the same overall amount of time regardless of the individual settings for each control lever, i.e., no means were provided for rapidly advancing the camming means between engagements with the various control levers to maintain the down or non-watering time at a minimum.

SUMMARY OF THE INVENTION

It is the primary object of the present invention to disclose and provide an improvement in automatic controller drive mechanism for rapidly advancing a camming means between camming engagements with associated cam followers while allowing for a predetermined timed advancement of said camming means by a constant speed motor drive means through engagements with such cam followers.

It is another object of the present invention to disclose and provide an improved controller drive mechanism which overcomes the aforesaid disadvantages of the control apparatus of U.S. Pat. No. 2,821,434 and provides for a means for rapidly advancing the camming means between engagements with the various control levers of said patented device while maintaining the single motor, constant speed drive thereof.

It is a still further object of the present invention to disclose and provide a rapid advance and drive transmission means for driving a camming means through interference engagements with an associated series of cam followers by constant speed motor drive, to provide a means for storing energy during operation of said motor drive prior to initiation of a camming cycle and to utilize such stored energy during a camming cycle for rapidly advancing the camming means between cam follower engagements to provide both a constant speed and rapid speed mode of advance for the camming means derived from a single, constant speed motor drive.

Generally stated, the aforesaid objects are obtained by the present invention through the provision of an improved clutch and transmission drive means which incorporates a rapid advance means for storing energy received from the motor during operation thereof at its constant speed and advances the camming means between engagements with the cam followers more rapidly than the advancement thereof would otherwise be due to the operation of the motor. More specifically, the transmission means is provided with a drive shaft connected to the motor and the rapid advance means is provided with a tubular member which may be connected to or mount the camming means thereon, the tubular member having an inside bore portion with a predetermined internal diameter. The transmission means drive shaft and the tubular member are provided with mating concave and convex bearing surfaces as part of an interconnecting clutch means to facilitate relative rotation therebetween. The clutch means is provided to selectively cause driving of the tubular member by the drive shaft, such clutch means including a ratchet assembly so that the tubular member may be advanced relative to the drive shaft by the associated rapid advance means. A wound wire spring is secured at one end to the transmission means drive shaft and is provided with a larger, constant diameter portion adjacent an opposite end which is positioned within the tubular member bore portion in a press fit relation. Prior to a camming cycle, the transmission drive shaft is driven by the constant speed motor relative to the tubular member associated with the camming means to twist the associated spring and store energy therein. Overtwisting, or overstoring of energy is prevented due to the spring's elongation and reduction in diameter due to such twisting which produces a slipping between the enlarged diameter portion and the camming means associated tubular member after a predetermined amount of twisting has occurred.

A camming cycle is initiated by operating the clutch means associated ratchet assembly to connect the transmission drive shaft to the tubular member to drive the camming means through an interfering engagement with a cam follower. The energy stored in the aforedescribed spring of the rapid advance means is insufficient to overcome the resistance offered by the cam and cam follower engagement. However, when a cam of the camming means leaves engagement with a cam follower, the spring attempts to return to its untwisted condition and rapidly rotates the tubular member relative to the drive shaft, advancing the camming means to a next cam and cam follower engagement while the one-way clutch drive and ratchet assembly is overdriven.

A better understanding of the invention in automatic controller drive mechanism, as well as further objects and advantages thereof, will become apparent to those skilled in the art from a consideration of the following explanation of a preferred exemplary embodiment of controller apparatus incorporating the within invention in controller drive mechanism. Reference will be made to the appended sheets of drawings wherein:

BRIEF DESCRIPTION OF THE DRAWINGS

FIG. 1 is a perspective view of an automatic irrigation control apparatus, according to the present invention, mounted in a pedestal and associated with underground water control lines shown in dotted line;

FIG. 2 is a plan view of the control panel of an exemplary embodiment of automatic irrigation control apparatus, according to the present invention;

FIG. 3 is a side view, partially in section, of the exemplary embodiment in automatic irrigation control apparatus of FIG. 2 taken therein along the plane III—III;

FIG. 8 is a sectional view of the exemplary embodiment of automatic irrigation control apparatus of FIG. 3 taken therein along the plane VIII—VIII, the pilot valve illustrated being in a closed position and the operating lever in a non-operating position;

FIG. 9 is a sectional view of the apparatus of FIG. 8 showing the operating lever positioned in a timing or operating position preparatory to being operated by the camming means;

FIG. 10 is a sectional view of the apparatus of FIGS. 8 and 9 showing the camming means engagement with the operating lever and the associated pilot valve in an open position;

FIG. 11 is a detail view, partially in section, of a camming means of the apparatus of FIG. 3 taken therein along the plane XI—XI; and FIG. 12 is a detail view, partially in section, of a portion of the means for rapidly advancing the camming means between engagements with the operating levers, the partial sectional view of FIG. 12 being a continuation of the portion of said means for rapidly advancing shown in FIG. 4.

DETAILED DESCRIPTION OF THE DRAWINGS

Figure 4:
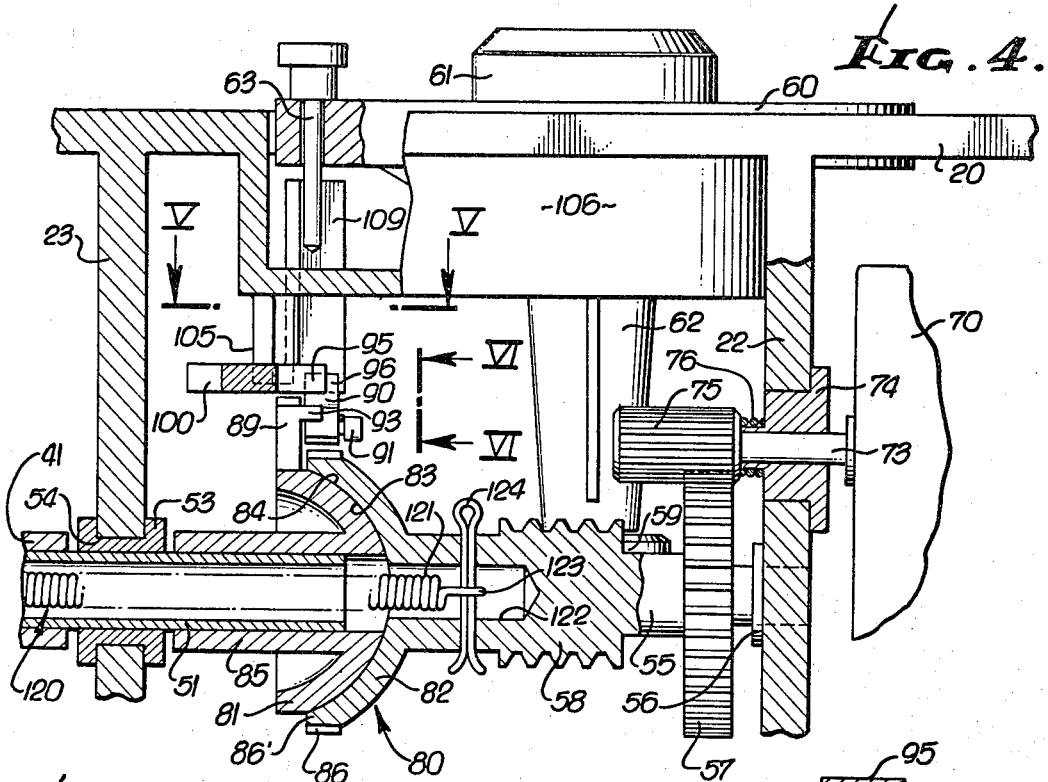
FIG. 4 is a detail view, partially in section, of the exemplary embodiment of irrigation control apparatus of FIG. 2 taken therein along the plane IV—IV.

An exemplary embodiment of the automatic irrigation control apparatus according to the present invention will now be explained in detail.

Referring first to FIG. 1, the exemplary embodiment of control apparatus of the present invention, indicated generally at 10, is of a size and configuration which suits it for mounting in a housing 11 supported on a pedestal 12 having a base 13. A cover plate 14 may be provided on the housing 11 to protect the control apparatus, indicated generally at 10, from the outside weather conditions. It should be noted that the pedestal and housing mounting of FIG. 1 is merely exemplary of one manner of installing the control apparatus of the present invention in association with control or pilot lines, as underground lines 15 through 18, shown in dotted line, running to various irrigation or sprinkling sections of an overall watering system. As will be explained in more detail hereinafter, the control apparatus, indicated generally at 10, is adapted to operate pilot valves in a predetermined timed sequence for selectively pressuring the lines 15 through 18 to operate pilot operated flow valves located in known manner in each of the system sections.

Referring now to FIGS. 2 and 3, the exemplary embodiment of control apparatus, indicated generally at 10, includes a face or mounting plate 20, a rear or back plate 21, and a plurality of interconnecting partition walls 22, 23, and 24. The major portions of the partition walls 22, 23, and 24 may be molded integrally with the face plate 20 and be assembled to mating corresponding portions thereof formed integrally of the back plate 21. Such assembly of front, back, and partition walls comprises a frame for mounting various operating portions of the control apparatus, the frame and operating portions being insertable into a housing such as housing 11 shown in FIG. 1.

As in my prior automatic irrigation control apparatus of U.S. Pat. No. 2,821,434, a bank of pilot valves, indicated generally at 25, is operated by a corresponding number of control levers, indicated generally at 30, the latter being operated by camming means, indicated generally at 40, driven by a clutch and transmission means, indicated generally at 50, associated with an electric, clocktype, motor 70.

Referring to FIGS. 3 and 8 through 10, particularly, the bank of pilot valves, indicated generally at 25, may be constructed as explained in my U.S. Pat. No. 2,821,434 and mounted between the partition walls 23 and 24 of the present exemplary embodiment of apparatus with the outlet lines, as line 26, extending outwardly through scalloped portions of the frame sidewall portion 27. Portion 27 is preferably formed integrally of the back wall 21 via a molding operation. Further, most of the components of the present apparatus are preferably made of plastic molded parts to provide a less expensive apparatus than would otherwise be attainable with machined metallic parts. A water inlet line 28 is connected to an inlet portion of the bank of pilot valves and, upon selective operation of the pilot valves due to positioning of the operating levers, as more fully explained hereinafter, each one of the outlet lines 26 may be interconnected to the inlet line 28 through the associated pilot valve to operate each of the associated pilot operated flow valves in the various sections of the irrigation system.

A series of control levers for operating the individual pilot valves of the apparatus are provided as in my prior U.S. Pat. No. 2,821,434 and as explained generally herein with reference to FIGS. 3 and 8 through 10. The control levers, indicated generally at 30, each includes an operating tip 31 which fits in a slot 32 (FIG. 9) provided in the head 33 mounted to the valve pin 34 of the associated pilot valve 35. The knob end 36 of each operating lever is provided with a fulcrum 37 which is selectively locatable between the teeth of the slotted ratchet means 29 formed integrally of the front face plate 20. A fulcrum or index finger point 37, 37' may be formed integrally of each of the knob ends 36 on either side of the lever body or shank 38 to engage between the continuous ratchet teeth extending across the face plate between the slots as seen in FIG. 2. Spring means, such as the coil spring 39 are provided on each control lever body, as seen in FIGS. 8 through 10, for biasing the lever knob associated fulcrums for index fingers 37 into the selected grooves in the ratchet means.

As can be seen by comparison of the showings of FIGS. 8 through 10, each control lever may be adjusted into different timing positions by moving its associated knob across the ratchet means 29 under the bias of the associated spring means 39. Through such positioning of each control lever, the length of engagement between the camming means and a cam follower formed in the lever is varied.

Camming means are provided in the exemplary embodiment, as indicated generally at 40, in FIGS. 3 and 11. Such means, in the exemplary embodiment, may include the provision of individual plastic molded cam shaft units 41 through 44 assembled in fixed relationship to one another and having integrally molded cams 45 through 48. The individual units 41 through 44 may be molded with interlocking connections as seen in FIG. 3. As seen in FIGS. 8 through 10, the rotation of the cam means brings the individual cams 45 through 48 into engagement with a cam follower portion, as portion 49, on each of the control levers which are adjusted into a position other than the extreme "off" position of FIG. 8. When the control lever is moved into an operating position, as shown in FIG. 9, the cam 45 engages follower portion 49 to pivot the tip in 31 of the control lever about its fulcrum or index finger portions 37 to open the associated pilot valve and interconnect the water supply inlet line 28 through the associated outlet line 26 to a selected pilot operated flow valve in the irrigation system via one of the pilot lines 15 through 18.

As is particularly contemplated within the present invention, the camming means for operating the pilot valves as hereinbefore explained is mounted to and driven by a clutch, transmission and drive shaft assembly including improvements therein which provide for a rapid advancement of the camming means between engagements with the various operating levers independently of the single motor drive and as hereinafter now explained in detail.

Referring now to FIGS. 4 and 12, the camming means, including the individual camming units 41 through 44, are fixed upon a tubular axle or driven shaft 51. The outer end of shaft 51 is journaled in a bearing 52 provided in an opening 53 formed in the outer partition wall 24 along one of the parting lines thereof between the upper portion of the partition molded integrally with the front plate and the lower portion of the partition molded integrally of the back plate. As seen in FIG. 4, an inner portion, spaced from the inner end of shaft 51, is journaled within the journal bearing 53 provided in an opening 54 formed in the partition wall 23 along a parting line between the upper and lower portions thereof. The journal bearings 52 and 53 may be assembled into their respective openings formed in the partition walls upon assembly of the front wall and its associated upper partition portions to the integrally molded back wall and lower partition portions. As will be explained in detail hereinafter, driven shaft 51 is driven by the transmission means, indicated generally at 50, and forms a part of the means for rapidly advancing the camming means between engagements with the respective control levers, indicated generally at 30, in accordance with the present invention.

The clutch and transmission means, indicated generally at 50, is driven by a conventional clock-type electric motor 70 in the present exemplary embodiment of control apparatus. Motor 70 is mounted to the control apparatus frame via the mounting bracket 71 which is secured to the back plate 21 by fastening means, such as screws 72. The motor drive shaft 73 is journaled in bearing 74 fixed in an appropriate opening provided in the partition wall 22 and mounts a pinion gear 75 at its outer end. As seen in FIG. 4, a spring 76 may be provided between the pinion gear 75 and the journal bearing 74. The transmission means includes a drive shaft 55 having one end journaled in journal bearing 56, fixed within an appropriate opening provided in partition wall 22, which mounts a spur gear 57 which meshes with and is driven by the motor driven pinion 75.

Means are provided for advancing the transmission drive shaft 55 and indicating the timed advancement thereof. In the exemplary embodiment, such means include the provision of a worm gear 58, which may be formed integrally of the drive shaft 55, which mates with a worm 59 mounted to the timing disk 60. As seen in FIGS. 2, 3, and 4, timing disk 60 is provided with a knob 61 for rotating disk 60 and a cantilevered arm or stud 62 having the worm 59 mounted on an end thereof for mating engagement with the worm gear 58. Rotation of drive shaft 55 under the influence of the electric motor 70 produces a timed rotation of a timing disk 60. As seen in FIG. 1, the upper surface of timing disk 60 is provided with a ring of perforations to receive timing pins in selected locations corresponding to the hours of two days and two nights for a 48-hour cycle. As will be explained hereinafter, the location of timing pegs on the timing disk, as peg 63, causes a predetermined timed operation of clutch portion of the transmission means to begin operation of a pilot valve operating cycle. Extra pegs, as pegs 64, may be mounted to appropriate pin holes provided in the face plate as seen in FIG. 2.

In accordance with the present invention, the transmission means is provided with an improvement in clutch means and means for rapidly advancing the camming means relative to the transmission drive shaft 55 driven by the motor 70. Considering the improvement in clutch means first, and referring particularly to FIGS. 3 and 4 through 7, the clutch means, according to the present invention, includes the provision of a clutch body, indicated generally at 80, and including an inner driven member 81 and an outer driving member 82. The outer driving member 82 is of bell shape having an inner concave bearing surface 83 and, as in the preferred exemplary embodiment herein, is formed integrally of the transmission drive shaft 55. The inner driven member 81 is also of a bell shape having an outer convex bearing surface 84 sized to mate within the concave bearing surface 83 of member 82. Bell-shaped inner driven portion 81 is preferably a molded plastic part having an integral hollow tubular body or journal portion 85 which receives the inner end of cam means mounting and driven shaft 51 in a press fit relation. The bearing faces or surfaces 83 and 84 of the outer and inner bell-shaped members 82 and 81, respectively, are preferably lubricated, as through the provision of grease therebetween, to facilitate relative rotation therebetween during rapid advancing of the camming means between control lever engagements as hereinafter explained.

Figure 6:
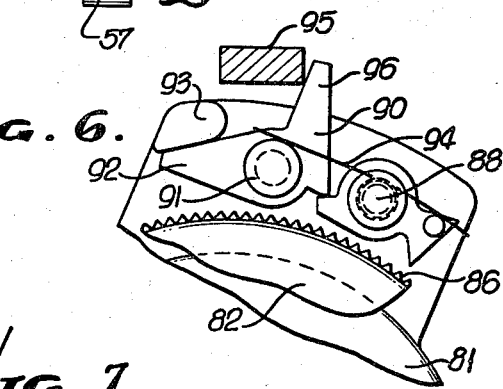
FIG. 6 is a detail view of a portion of the clutch mechanism of the apparatus of FIG. 4 taken therein along the plane VI—VI, showing the clutch holding pawl in unlocked condition.
Figure 7:
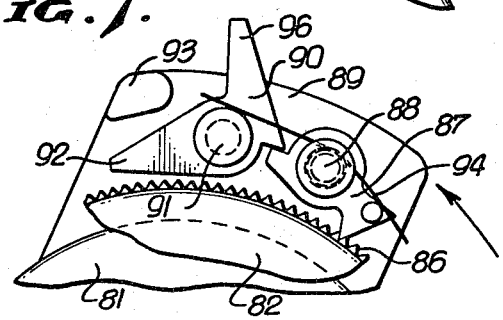
FIG. 7 is a detail view as in FIG. 6, but showing the clutch holding pawl in a locked position.

The clutch means is further provided with a locking pawl and ratchet wheel assembly for interconnecting the outer drive member 82 to the inner driven member 81 to cause rotation of the driven shaft 51 and associated cam shaft (units 41 through 44) by the drive motor 70 in response to actuation by the timing pin 63. A ratchet wheel 86 is preferably formed integrally about a peripheral rim 87 of the bell-shaped drive member 82 which is adapted to be engaged by a locking pawl 87 pivotally mounted by pin 88 on a radially extending flange 89 formed integrally of the inner bell-shaped driven member 81. The locking or holding pawl 87 is operated by an associated operating pawl 90 which is also pivotally mounted on flange 89 by a pivot pin 91. Arcuate movement of operating pawl 90 is restricted due to the provision of a stop arm 92 adapted to engage stop 93, provided on flange 89, as best seen in FIG. 6. The holding pawl 87 is normally biased into a holding or ratchet engaging or locking position as seen in FIG. 7 due to the bias of the spring means 94. However, prior to the initiation of a pilot valve operating cycle, a holding lever 95 is normally positioned in engagement with the arm 96 of operating pawl 90 (see FIG. 6) to hold the locking or holding pawl in an unlocked position. With the pawl assembly in the position of FIG. 6, the rotation of transmission drive shaft 55 due to the continuous operation of timing motor 70 produces a timed rotation of the timing disk 60 but does not cause a rotation of the camming means via driven shaft 51 and clutch inner driven member 81 until the holding pawl 87 is released through displacement of holding lever 95 away from arm 96 of the operating pawl 90.

Figure 5:
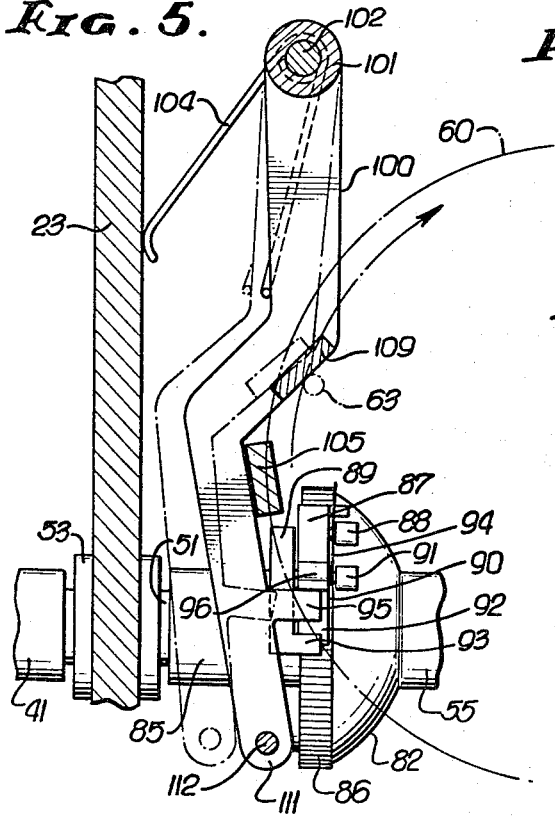
FIG. 5 is a detail view, partially in section, of a portion of the apparatus of FIG. 4 taken therein along the plane V—V.

The pawl assembly operating control arm 100, as best seen in FIGS. 3 and 5, is mounted at one end 101 on a stud 102 secured in the boss 103 formed integrally of the underside of face plate 20. Arm 100, as best seen in FIG. 5, is normally biased by spring means 104 about the stud 102 into engagement with a stop 105 formed integrally of a housing 106 molded to the underside of face plate 20. The housing 106 is open in a quadrant thereof, defined by end walls 107 and 108, as seen in FIG. 3 to allow engagement between the depending timing pins, as pin 63 moving about within the housing, with a ramp 109 formed integrally of lever 100. As a timing pin 63 is moved by the timing disk 60 into engagement with the ramp portion 109 of lever 100, the lever 100 is pivoted about its pivot pin 102 against the bias of spring 104 to move the lever portion 95 out of engagement with the operating pawl 90, said lever 100 moving from the position shown in solid line in FIG. 5 to the released position shown in dotted line in FIG. 5. Such movement of the control arm or lever 100 may also be effected by manually moving the start button 110 (FIG. 2) protruding out of the face plate 20 and which is connected to the free end 111 of the control arm by a vertical pin 112.

It can be seen by the foregoing, that the cam means, indicated generally at 40, may be placed in a timed rotational movement under the timing motor drive of motor 70 via the transmission shaft 55 when the start button 110, or a timing peg 63, moves control arm 100 to disengage the control arm lever 95 from arm 96 of operating pawl 90. On release of pawl 90, the holding or locking pawl 87 moves under its normal spring bias into the holding position of FIG. 7 wherein the inner driven bell-shaped clutch member 81 is engaged in driving relation with the outer bell-shaped clutch member 82. With the construction of the apparatus as thus far explained, a single speed of operation only for the camming means would be provided. As is particularly contemplated within the scope of the present invention, means are provided for rapidly advancing the camming means, indicated generally at 40, between engagements between the cams 45 through 48 with the various operating levers, indicated generally at 30, independently of the single timing drive motor 70 to provide for a rapid indexing of the cam means between control stations so that non-watering time for the control cycle is greatly reduced and a sequential timed watering operation for each area of the irrigation system can be produced in a virtually continuous watering operation. A preferred exemplary embodiment of such means for rapidly advancing the camming means relative to the operating levers independently of the single speed drive motor 70 and associated transmission drive shaft 55 will now be explained in detail.

Referring particularly to FIGS. 4 and 12, the exemplary embodiment of means for rapidly advancing the camming means between engagements with the pilot valve operating levers, indicated generally at 30, includes the provision of a means for receiving and storing energy during rotation of the transmission drive shaft 55 relative to the driven shaft 51, as when the holding pawl is in a released position as shown in FIG. 6, and for releasing said energy to rapidly advance the camming means between engagements with the operating levers when it is not necessary to overcome the resistance offered by the engagement between a camming means cam and an associated control lever, a certain amount of driving power being required to turn a cam past a cam follower portion 49 of the control lever to move the associated pilot valve into an open position. Such means in the exemplary embodiment specifically includes the provision of a torsion spring means, indicated generally at 120 in FIGS. 4 and 12, within the driven shaft 51 and fixed to the transmission drive shaft 55. As seen in FIG. 4, one end 121 of the spring means 120 is located within an inner bore 122 of the transmission drive shaft 55 with an end eye portion 123 non-rotatably secured to shaft 55 via the cotter pin 124. Therefore, the one end 121 of the torsion spring means 120 is rotated by and with the transmission drive shaft 55 under the constant timing drive of motor 70 via the pinion and spur gears 75 and 57 respectively. As seen in FIG. 12, the portion 125 of the spring means 120, adjacent the end opposite the one end 121 in the exemplary embodiment, is provided with an enlarged outside diameter, relative to the main body of spring means 120, which is greater than the inside diameter of the driven tubular shaft 51 when the spring means 120 is in a relaxed, unwound condition. The portion 125 must therefore be press fitted into the bore 126 of driven shaft 51 or wound to reduce its diameter during assembly thereinto. An end cap 127 is provided to close the end through which the spring means 120 is normally inserted and which, in the exemplary embodiment, is journaled in a bearing 52 of the outside partition wall 24. In actual practice, it has been found that it is desirable to make the hollow cam or driven shaft 51 of a one-quarter inch O.D., 0.035 wall seamless brass tube, alloy 330 or 218 with an inside diameter of 0.180 plus 0.005 and minus 0.000. Further, it has been found desirable to knurl the outside diameter of the cam shaft or driven shaft 51 to facilitate retention of the molded plastic cam units 41 thorough 44 which may be merely pressed thereon. In a preferred embodiment using the aforesaid brass tube for cam shaft 51, the torsion spring means 120 consisted of a 0.018 diameter spring steel wire, close wound, spring with a 0 – 3 ounce initial tension and a right hand pitch. The main body portion of the spring had an outside diameter of between 0.170 and 0.180. The larger diameter portion 125 was provided with an outside diameter of between 0.188 and 0.192. (The aforesaid dimensions being in inches.)

Prior to a pilot valve operating cycle initiation, the transmission shaft 55 rotates relative to the stationary cam or driven shaft 51 as hereinbefore explained. With the spring means of the aforedescribed construction, the one end 121 will be rotated relative to the stationary enlarged diameter end 125 held within the stationary cam shaft 51. However, the continued twisting of the spring means causes a slight elongation thereof and a reduction in the outside diameter of the enlarged portion 125 until slippage between portion 125 and the surrounding stationary cam shaft 51 occurs. Therefore, energy is stored by spring means 120 during prepilot valve operating cycles due to the rotation of the transmission shaft 55 relative to the stationary cam shaft 51 which is ready to be used for rapid advancing of the cam means thereafter. Upon initiation of a pilot valve operating cycle, the clutch means, including the aforedescribed pawl assembly, causes concurrent rotation of the transmission shaft 55 and cam shaft 51 passed the resistance offered by the individual control levers of the control levers indicated generally at 30. When a control lever, as lever 38 is positioned as shown in FIG. 9, the associated cam must force the lever 38 in a pivotal movement about its fulcrum 37 against the resistance due to the conventionally provided self-closing valve spring within the pilot valve 35. The spring means 120 is chosen and the dimensions for the interference fit between the enlarged diameter 125 and the bore 126 of cam shaft 51 are chosen so that the spring means 120 cannot store sufficient energy to overcome the resistance offered by the control lever. It is therefore necessary to positively drive shaft 51 via the clutch and transmission means to complete a timing operation during which a pilot valve is held in open position.

However, when the cam, as cam 45 in FIG. 10, is in a non-interfering relation with the cam follower, as cam follower 49 in FIG. 10, of the associated control lever, then the spring means 120, in its effort to return to an untwisted condition, twists the cam shaft 51 via its enlarged diameter portion 125 to cause a rapid advance thereof until an engagement occurs between another cam on the cam means, indicated generally at 40, and an associated control lever cam follower, as 49 in FIGS. 8 through 10.

From the foregoing detailed description of a preferred exemplary embodiment of the automatic irrigation control apparatus of the present invention, it is believed that those skilled in the art will appreciate the foregoing objects for the present invention have been obtained. Further, it is again noted that the within detailed description of an embodiment of control apparatus within the present invention is exemplary only and that other alternatives, modifications and adaptations thereof may be made by those skilled in the art within the scope and spirit of the invention herein which is defined in the following claims.

I claim:

1. In an automatic control apparatus having a camming means for operating a series of cam followers, a constant speed motor, and clutch and transmission means for selectively connecting said camming means to said constant speed motor to be driven thereby past said cam followers, said followers offering resistance to the movement of said camming means thereby when engaged by said camming means, the improvement comprising the provision of:

rapid advance means associated between said clutch and transmission means and said camming means for storing energy received from said motor during operation thereof and for advancing said camming means between engagements with said cam followers by said stored energy more rapidly than the advancement thereof by said motor.

2. In an automatic control apparatus having a camming means for operating a series of cam followers, a constant speed motor, and clutch and transmission means for selectively connecting said camming means to said constant speed motor to be driven thereby past said cam followers, said followers offering resistance to the movement of said camming means thereby when engaged by said camming means, said transmission means being provided with a drive shaft connected to said motor, the improvement comprising the provision of:

rapid advance means associated between said clutch and transmission means and said camming means for storing energy received from said motor during operation thereof and for releasing the same for advancing said camming means between engagements with said cam followers, wherein said rapid advance means comprises:
a tubular member connected to said camming means and having an inside bore portion with a predetermined internal diameter over said portion;
a wound wire spring secured at one end to said transmission means drive shaft and having a constant diameter portion thereof spaced from said one end and positioned within said tubular member bore portion, said spring portion having an outside diameter when in a relaxed state which is slightly larger than the internal diameter of said tubular member inside bore portion.

3. A rapid advance and drive transmission means for driving a camming means through interference engagements with an associated series of cam followers by a constant speed motor drive and for rapidly advancing said camming means between said engagements comprising:
a cam shaft mounting said camming means for engagements with said cam followers;
a drive shaft connected to said motor;
clutch means for selectively connecting said cam shaft to said drive shaft to be driven thereby at a constant speed through engagement with said cam followers; and
additional means connected between said drive shaft and said cam shaft for receiving and storing energy due to rotation of said drive shaft relative to said cam shaft when said clutch means has not been operated to connect said shafts and for releasing said energy to rotate said cam shaft relative to said drive shaft when said cam shaft associated camming means is out of engagement with said cam followers, wherein:

said additional means comprises a resilient twistable member capable of storing energy through the twisting thereof and one end of said member is secured to said drive shaft and another end is secured to said cam shaft.

4. The transmission means of claim 3 wherein:

said cam shaft is provided with a hollow cylindrical bore portion having a virtually constant internal diameter; and said twistable member comprises a wound wire spring having a virtually constant outside diameter portion adjacent said other end and is provided in a friction fit engagement within said cam shaft bore portion, said spring portion diameter reducing under continued twisting of said one end relative to said other end to relieve said friction fit and allow relative turning between said spring and said cam shaft after a predetermined amount of twisting thereof has occurred.

* * * * *